US009180843B2

United States Patent
Heit et al.

(10) Patent No.: US 9,180,843 B2
(45) Date of Patent: *Nov. 10, 2015

(54) DUAL RATE DUAL DIRECTION SPRING SYSTEM

(71) Applicant: HONDA MOTOR CO., LTD., Tokyo (JP)

(72) Inventors: Casey Heit, Marysville, OH (US); Lee N. Bowers, Springfiled, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 107 days.

This patent is subject to a terminal disclaimer.

(21) Appl. No.: 14/078,100

(22) Filed: Nov. 12, 2013

(65) Prior Publication Data

US 2015/0128746 A1    May 14, 2015

(51) Int. Cl.
*B62K 23/06* (2006.01)
*B60T 7/10* (2006.01)
*G05G 1/04* (2006.01)
*G05G 11/00* (2006.01)

(52) U.S. Cl.
CPC ............... *B60T 7/104* (2013.01); *B62K 23/06* (2013.01); *G05G 1/04* (2013.01); *G05G 11/00* (2013.01)

(58) Field of Classification Search
CPC .......... B62K 23/02; B62K 23/06; B62L 3/02; F16H 61/16; F16H 61/18; F16H 2061/185; B60T 7/102; B60T 7/104; Y10T 74/20287; Y10T 74/2042; Y10T 74/2039; G05G 1/04
See application file for complete search history.

(56) References Cited

U.S. PATENT DOCUMENTS

| 2,203,057 | A |   | 6/1940  | Moore |
|-----------|---|---|---------|-------|
| 3,208,299 | A |   | 9/1965  | Leonard et al. |
| 4,188,834 | A |   | 2/1980  | Wakatsuki et al. |
| 4,624,350 | A |   | 11/1986 | Akashi |
| 4,629,206 | A |   | 12/1986 | Omagari et al. |
| 4,840,082 | A |   | 6/1989  | Terashima et al. |
| 4,976,166 | A | * | 12/1990 | Davis et al. ............ 74/512 |
| 4,977,792 | A |   | 12/1990 | Nagano |
| 5,038,881 | A |   | 8/1991  | Wysocki et al. |
| 5,613,584 | A |   | 3/1997  | Bremner et al. |
| 6,521,851 | B2 |  | 2/2003  | Handa et al. |
| 6,695,086 | B2 |  | 2/2004  | Kawamoto |
| 6,835,904 | B2 |  | 12/2004 | McGuire et al. |

(Continued)

FOREIGN PATENT DOCUMENTS

JP  4247052 B2  4/2009
WO  00/50295 A1  8/2000

*Primary Examiner* — Thomas Diaz
(74) *Attorney, Agent, or Firm* — Squire Patton Boggs (US) LLP

(57) ABSTRACT

Various embodiments may provide a convenient mechanism and system for users of vehicles that include handbrakes to operate reverse lockout deactivation mechanisms in connection with the handbrake. For example, saddle-type vehicles such as an all-terrain vehicle (ATV), snowmobile, motorcycle, or the like may benefit from certain embodiments. For example, the system that combines brake, reverse lockout deactivation, and parking brake mechanisms may benefit from a dual rate, dual direction spring system. An apparatus can include a first lever configured to pivot about a first axis. The apparatus can also include a second lever mounted with the first lever and configured further to pivot about a second axis offset from the first axis. The second lever can be configured to be biased to a first position by a first spring and a second spring.

21 Claims, 24 Drawing Sheets

(56) References Cited

U.S. PATENT DOCUMENTS

| | | |
|---|---|---|
| 8,490,998 B1 | 7/2013 | Stevens |
| 2007/0227290 A1 | 10/2007 | Ferenc et al. |
| 2008/0121063 A1 | 5/2008 | Thrower |
| 2009/0038427 A1* | 2/2009 | Watarai ................ 74/473.13 |
| 2010/0083788 A1 | 4/2010 | Jordan et al. |
| 2013/0069355 A1 | 3/2013 | Gohr et al. |
| 2013/0098195 A1 | 4/2013 | Thielvoldt et al. |
| 2013/0146385 A1 | 6/2013 | Bowers |
| 2015/0020638 A1* | 1/2015 | Oakes et al. ............. 74/490.15 |

* cited by examiner

DUAL RATE DUAL DIRECTION SPRING SYSTEM

BACKGROUND

1. Field

Various embodiments may provide a convenient mechanism and system for users of vehicles that include handbrakes to operate reverse lockout deactivation mechanisms in connection with the handbrake. For example, saddle-type vehicles such as an all-terrain vehicle (ATV), snowmobile, motorcycle, or the like may benefit from certain embodiments. For example, the system that combines brake, reverse lockout deactivation, and parking brake mechanisms may benefit from a dual rate, dual direction spring system.

2. Description of the Related Art

FIG. 1 illustrates a cross-section view of a portion of a reverse lockout deactivation system. As shown in FIG. 1, lever pivot bolt 120 may extend through the assembly and may serve as one of the axes of the system. Similarly, reverse pivot bolt 140, which may be implemented as a screw, may pass through the reverse engagement lever 130 and the brake lever 110, but not the reverse lockout deactivation lever 160. The reverse pivot bolt 140 may be provided with a threaded area 141 within the brake lever 110, between an upper pivot area 143 and a lower pivot area 145.

The reverse engagement lever 130 may have integrated parking brake functionality. Thus, as a second lever, it can be configured to be pivoted about a second axis (for example, reverse pivot bolt 140) to a third position different from the first or neutral position or the second or reverse-lockout deactivation position. The brake lever 110 or first lever can be configured to engage a parking brake mechanism of the vehicle when the second lever is in the third position. A two-way spring 170 can be configured to bias the second lever (for example reverse engagement lever 130) to the first position, as distinct from both the second position and the third position. Typically, this dual direction spring system may provide only approximately a single force with respect to either direction away from the first position.

FIG. 2 illustrates a single spring system. FIG. 2 illustrates a top view of a first position of a reverse engagement lever 130. As shown in FIG. 2, the reverse engagement lever 130 may be configured to pivot on reverse pivot bolt 140. Moreover, the reverse engagement lever 130 may be provided with a reverse engagement lever tab 133 that is configured to provide an interference engagement with brake lever pad 113 on brake lever 110. This pad and tab arrangement may be used in combination with two-way spring 170 to bias the lever in the first position. As shown in FIG. 2, the tolerance between a brake lever pad and the reverse engagement lever tab can make it difficult avoid free play in the system.

Other alternatives include an approach in which a parking brake lever and a reverse lockout deactivation pin are separated. FIG. 3 illustrates a parking and reverse separated lever and pin system. As shown in FIG. 3, a parking brake lock lever 310 can be provided separate from a reverse pin 320. This approach may require higher complexity for a user of the system, such as requiring a three step operation for reverse.

FIG. 4 illustrates an exploded view of a single rate dual direction spring system. As shown in FIG. 4, a single spring 410 can be configured to operate with respect to a single base spring stopper 420 and lever spring stopper 430. FIG. 5 illustrates an assembled view of the single rate dual direction spring system of FIG. 4. As shown in FIG. 5, a same force can be applied by the single spring, in both directions.

SUMMARY

According to certain embodiments, an apparatus can include a first lever configured to pivot about a first axis. The apparatus can also include a second lever mounted with the first lever and configured further to pivot about a second axis offset from the first axis. The second lever can be configured to be biased to a first position by a first spring and a second spring. The first lever can be configured to engage a braking system of a vehicle when the first lever is pivoted about the first axis and the second lever is in the first position. The second lever can be configured to be pivoted about the second axis to a second position different from the first position. The first lever can be configured to disengage a reverse lockout system of the vehicle when the second lever is in the second position. The second lever can be configured to be pivoted about the second axis to a third position different from the first position or the second position. The first lever can be configured to hold in a brake activated position to function as a parking brake of the vehicle when the second lever is in the third position.

In certain embodiments, a method can include mounting a second lever on a first lever configured to pivot about a first axis, wherein the second lever is mounted to pivot about a second axis offset from the first axis. The method can also include biasing the second lever to a first position by a first spring and a second spring. The method can further include arranging the first lever to engage a braking system of a vehicle when the first lever is pivoted about the first axis and the second lever is in the first position. The method can additionally include arranging the second lever to be pivoted about the second axis to a second position different from the first position. The method can also include arranging the first lever to disengage a reverse lockout system of the vehicle when the second lever is in the second position. The method can further include arranging the second lever to be pivoted about the second axis to a third position different from the first position or the second position. The method can additionally include arranging the first lever to hold in a brake activated position to function as a parking brake of the vehicle when the second lever is in the third position.

BRIEF DESCRIPTION OF THE DRAWINGS

For proper understanding of the invention, reference should be made to the accompanying drawings, wherein.

DETAILED DESCRIPTION

According to certain embodiments, a single lever can be used to operate the reverse inhibitor deactivation and parking brake functions of a vehicle. Different forces can be applied by a user of the lever in different directions, in certain embodiments.

More particularly, certain embodiments provide two springs that, together, are configured to apply different forces in different directions. The system can also eliminate free play, which can be found in a single spring system. Rather, the two springs can allow the system to have spring preload in a neutral position, to eliminate free play.

Figure 1:
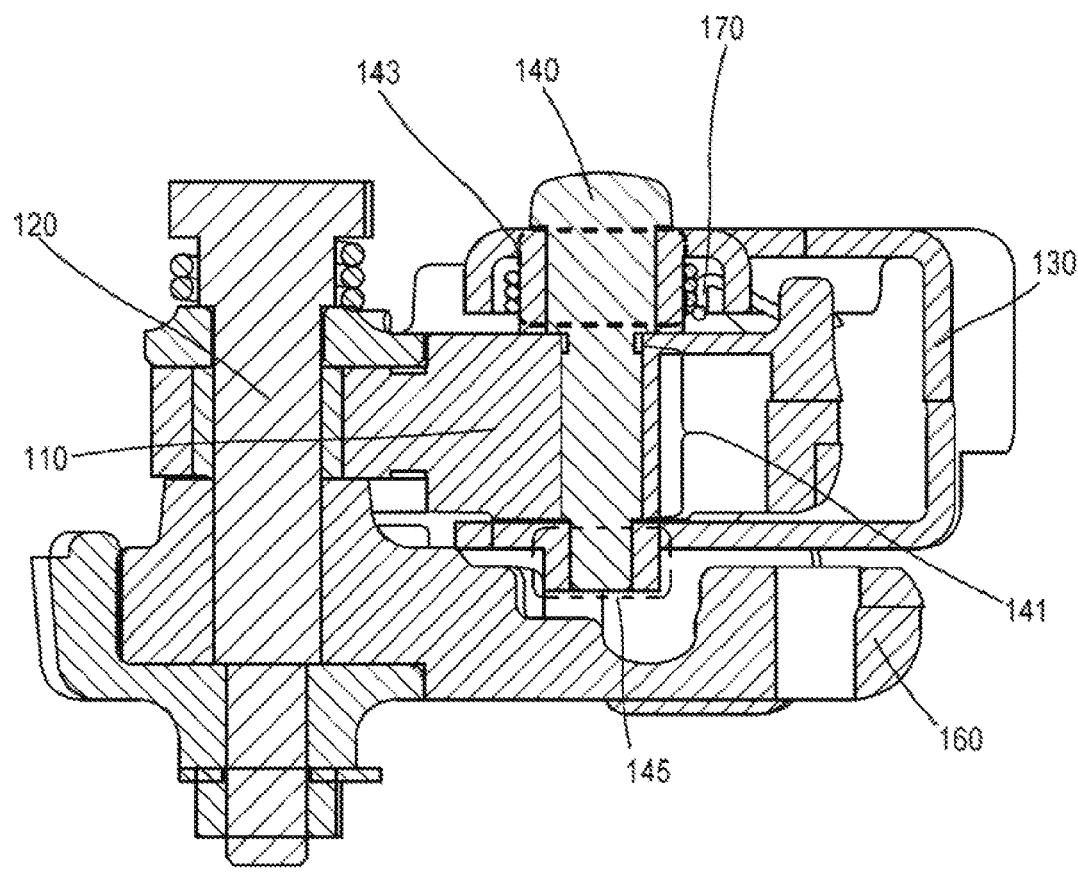
FIG. 1 illustrates a cross-section view of portion of a reverse lockout deactivation system.
Figure 2:
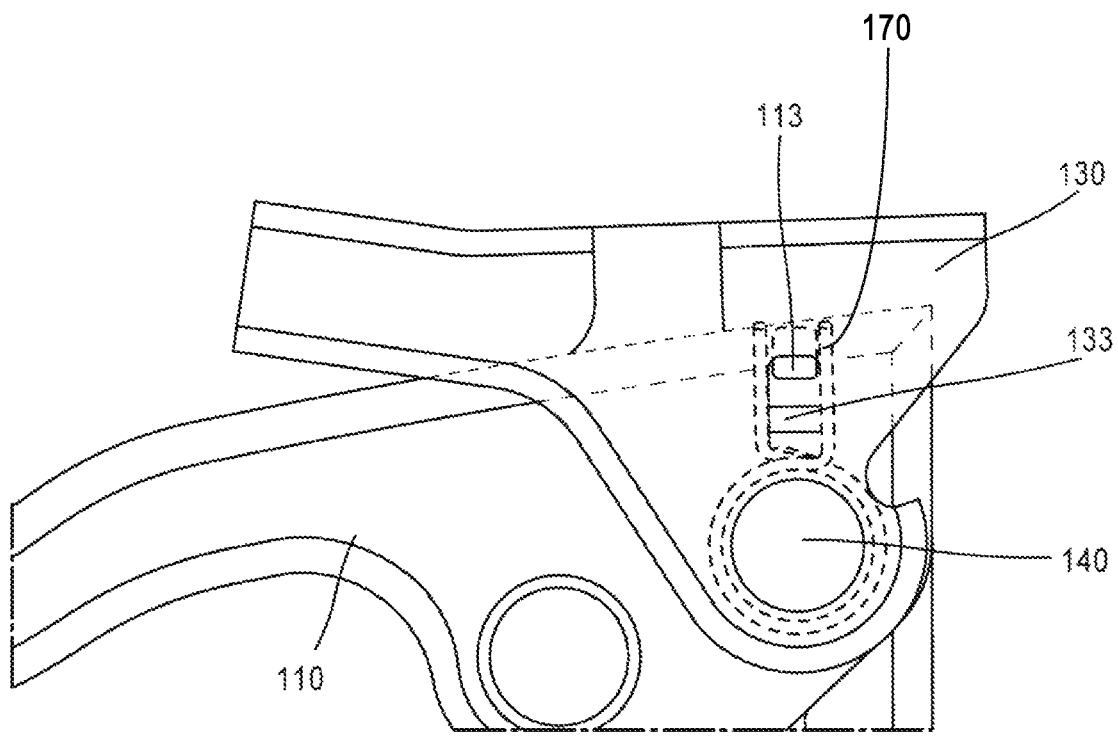
FIG. 2 illustrates a single spring system.
Figure 3:
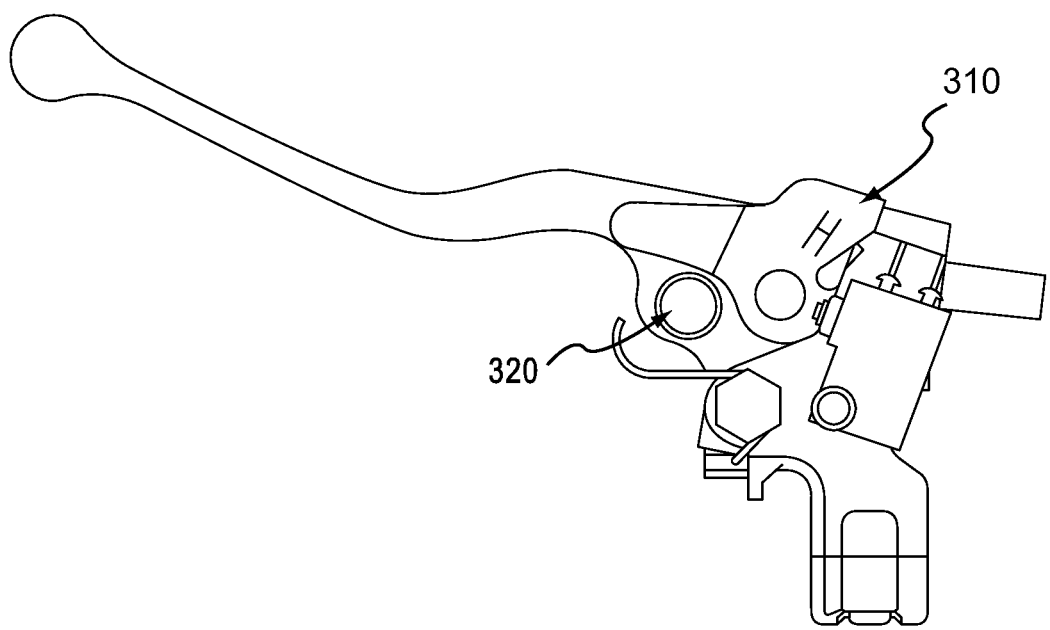
FIG. 3 illustrates a parking and reverse separated lever and pin system.
Figure 4:
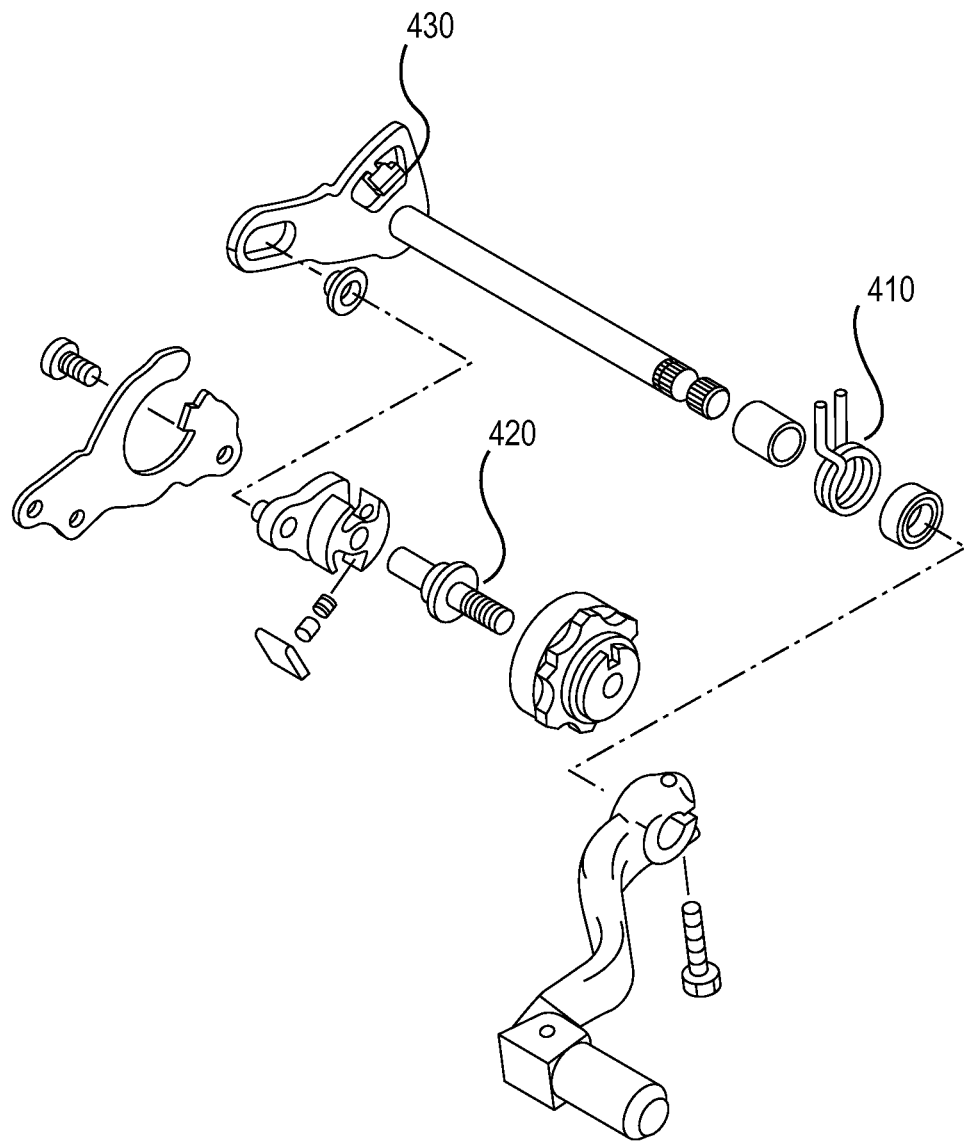
FIG. 4 illustrates an exploded view of a single rate dual direction spring system.
Figure 5:
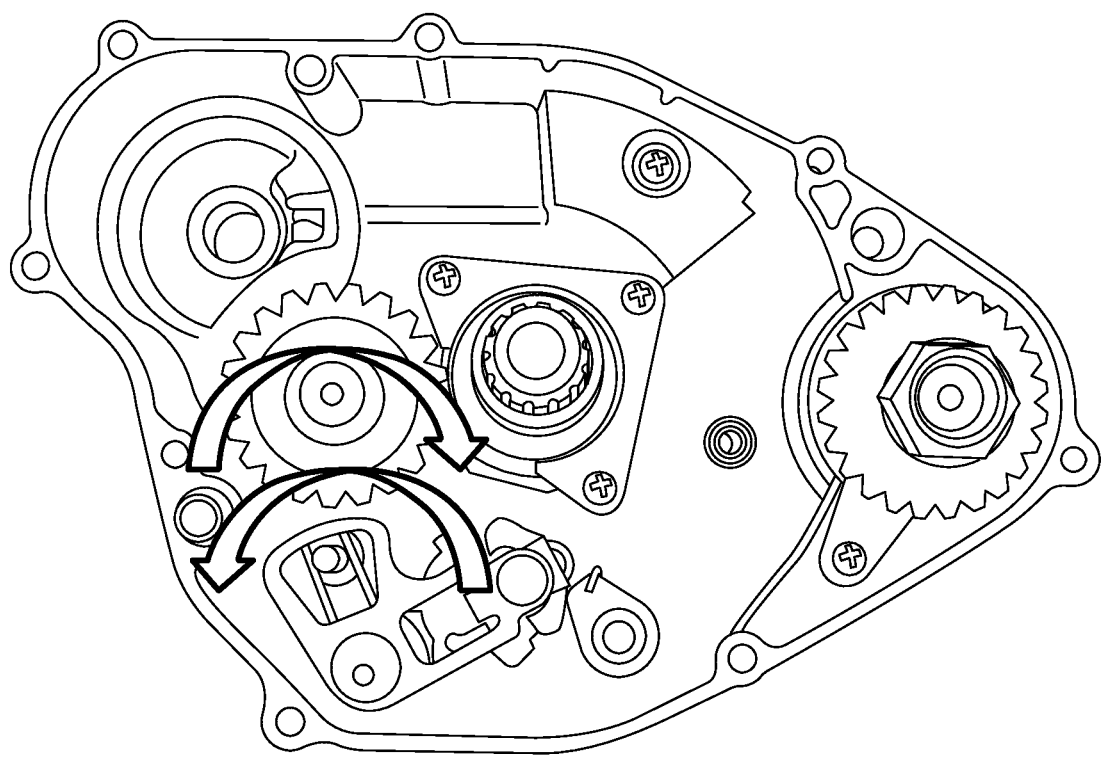
FIG. 5 illustrates an assembled view of the single rate dual direction spring system of FIG. 4.
Figure 6:
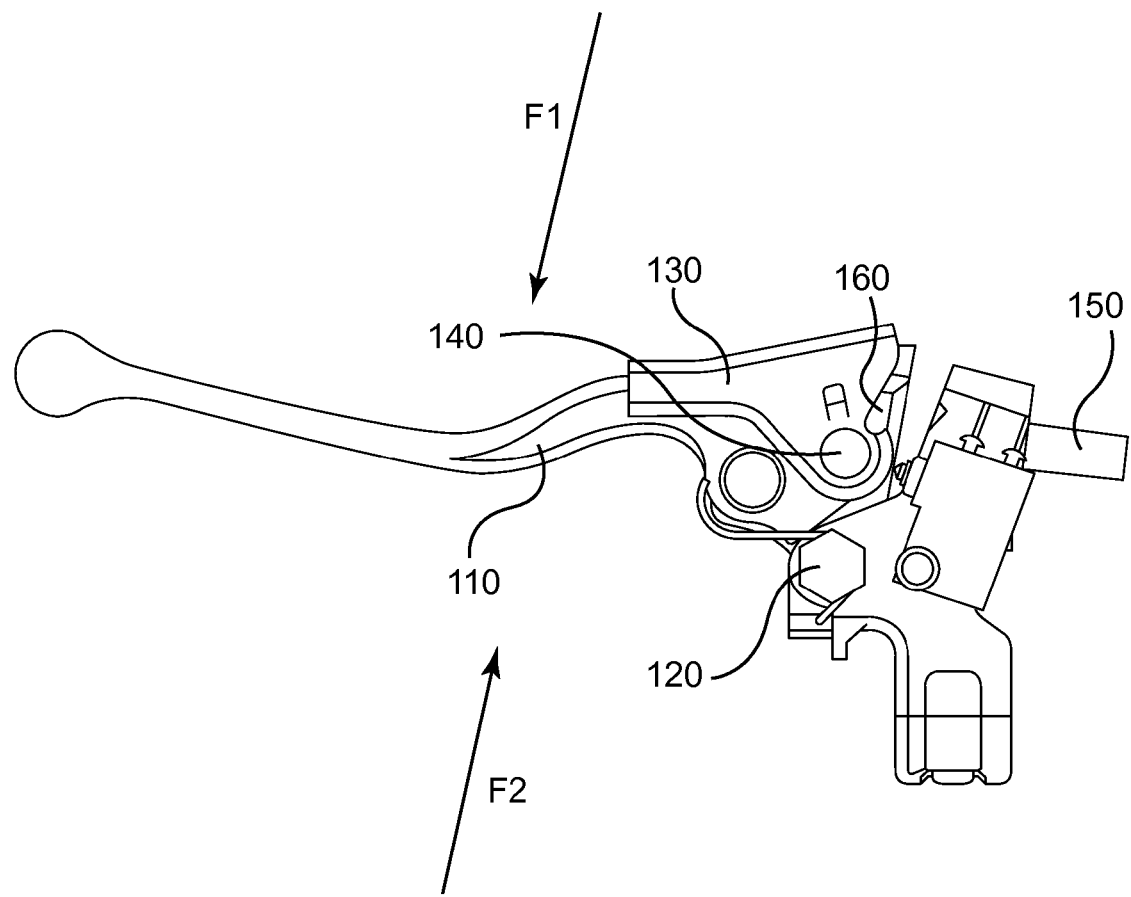
FIG. 6 illustrates a dual rate dual direction spring system according to certain embodiments.

FIG. 6 illustrates a dual rate dual direction spring system according to certain embodiments. As shown in FIG. 6, a first force F1 provided by a spring system in a first direction may be different from a second force F2 provided by the spring system in a second direction. These first and second forces F1, F2 may be different from any forces provided by the cables 150.

Figure 7:
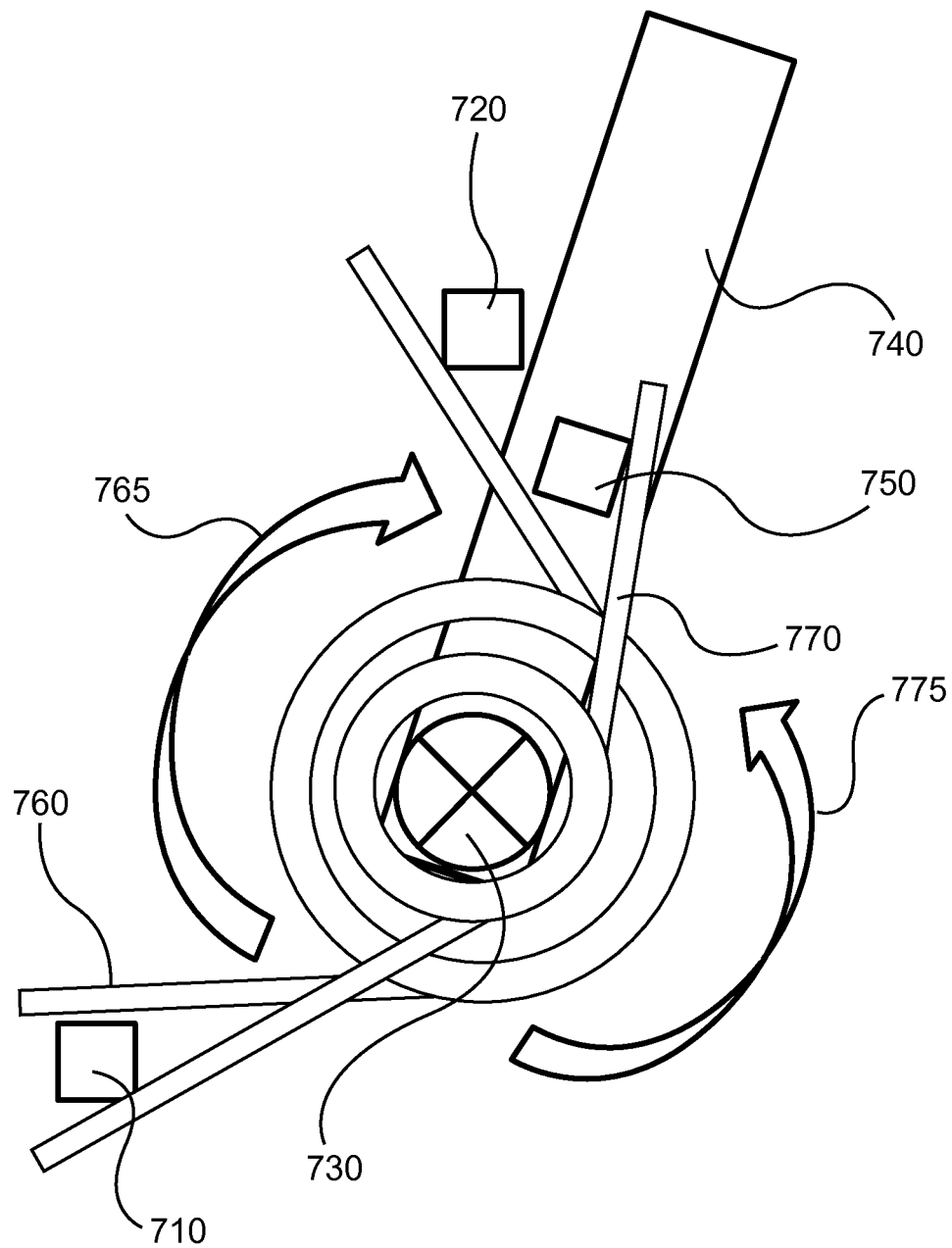
FIG. 7 illustrates a top view of an arrangement including springs in a first position, according to certain embodiments.

FIG. 7 illustrates a top view of an arrangement including springs in a first position, according to certain embodiments. As shown in FIG. 7, an arrangement can include, extending upward from a base (not shown) a first base stopper 710 and a second base stopper 720. The arrangement can also include a pivot 730, which can pass through lever 740 and into or through the base. Lever stopper 750 can extend from the lever 740.

A first spring 760 can have a first spring torque 765 that is clockwise. Likewise, a second spring 770 can have a second spring torque 775 that is counter-clockwise. The first spring torque 765 can be greater than the second spring torque 775. In the first position, as illustrated, the first spring 760 can be in contact with the first base stopper 710 and the second base stopper 720. This can be a neutral position of the lever 740, namely a position when no external forces, such as forces provided by a user's hand, are being applied.

Figure 8:
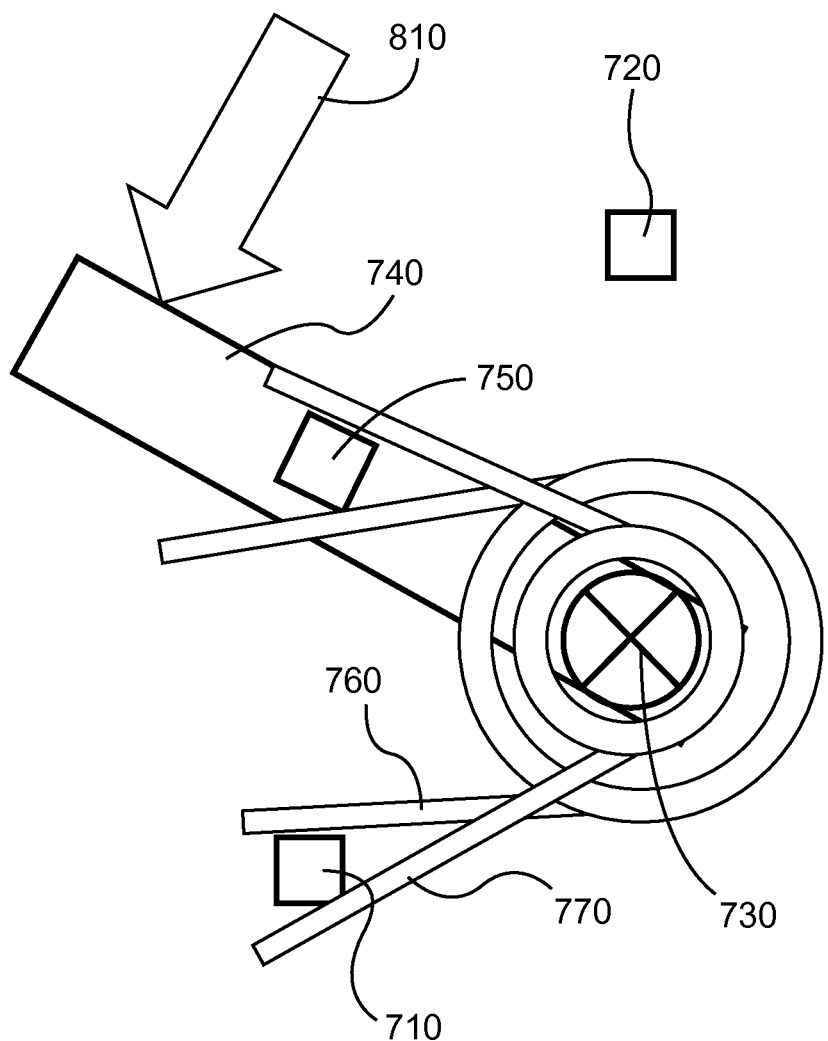
FIG. 8 illustrates a top view of an arrangement including springs in a second position, according to certain embodiments.

FIG. 8 illustrates a top view of an arrangement including springs in a second position, according to certain embodiments. As shown in FIG. 8, a first external force 810 can be applied in a counter-clockwise direction to lever 740. This first external force 810 can be supplied, for example, by a user's hand. As a result of the first external force 810, the lever 740 can be moved to a second position, as shown. The first spring 760 can lose contact with the second base stopper 720. Meanwhile, second spring 770 can be relaxed, while remaining in contact with lever stopper 750. The second spring 770 can be configured to have an arm that is short enough to avoid interacting with the second base stopper 720. The lever 740 can be configured to pass over the second base stopper 720, for example, without interacting with the second base stopper 720.

Figure 9:
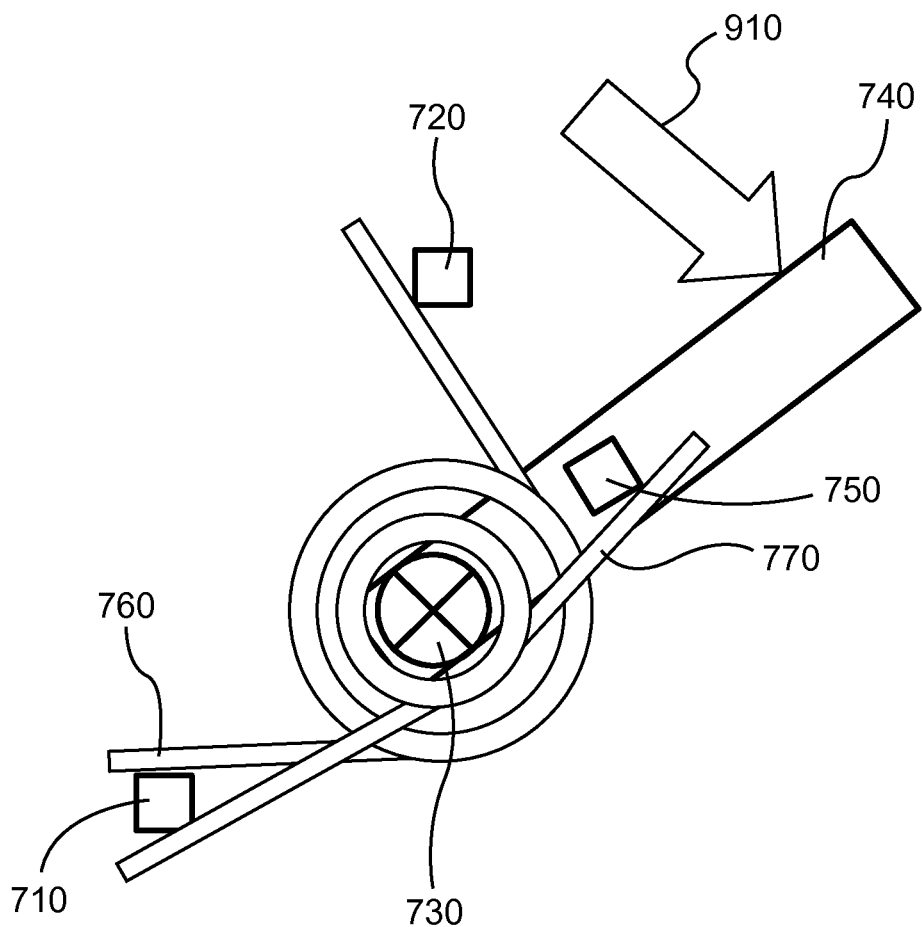
FIG. 9 illustrates a top view of an arrangement including springs in a third position, according to certain embodiments.

FIG. 9 illustrates a top view of an arrangement including springs in a third position, according to certain embodiments. As shown in FIG. 9, a second external force 910 can be applied in a clockwise direction to lever 740. This second external force 910 can be supplied, for example, by a user's hand. As a result of the second external force 910, the lever 740 can be moved to a third position, as shown. In this third position, the first spring 760 can remain in contact with the first base stopper 710 and the second base stopper 720. Thus, relative to the first position, the first spring 760 may not move when the lever 740 moves to the third position. By contrast, second spring 770 can be compressed.

Figure 10:
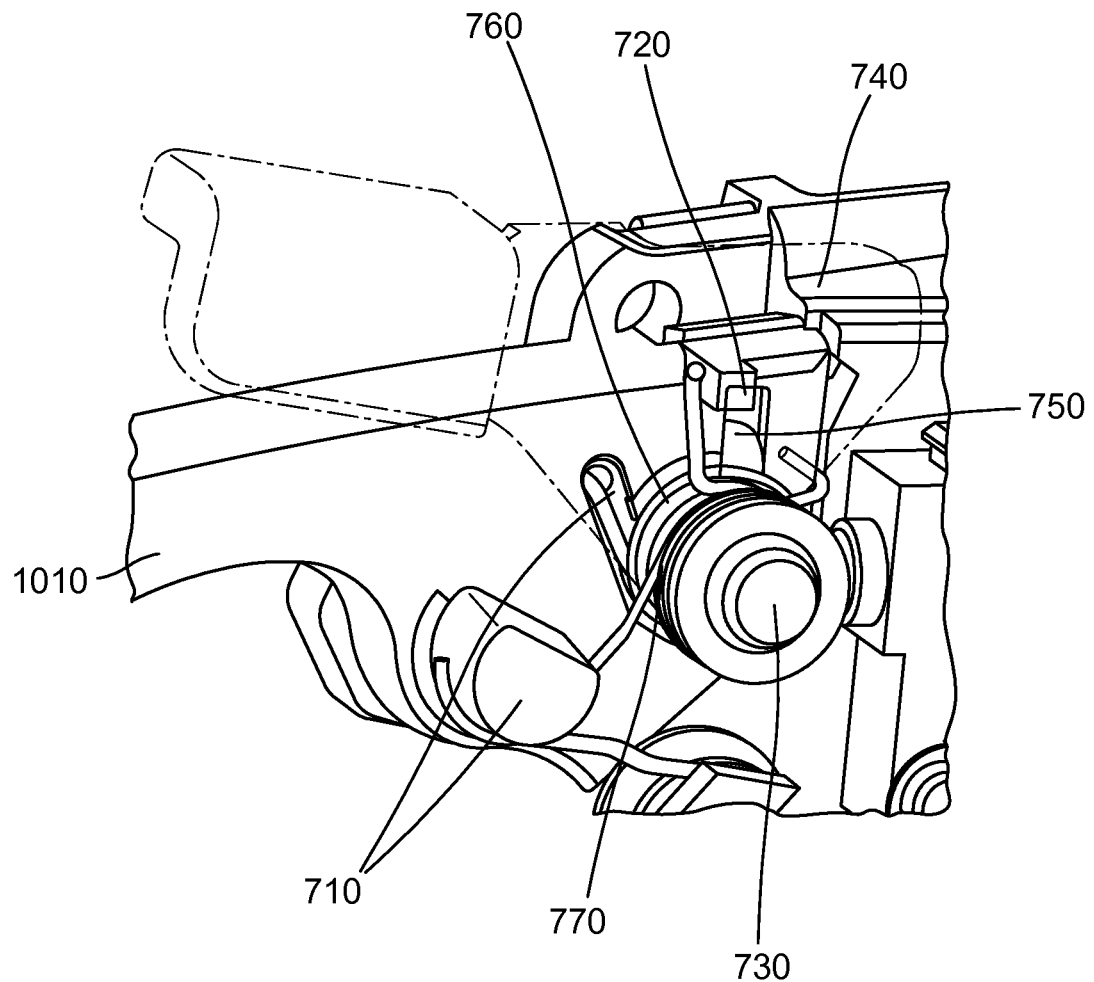
FIG. 10 illustrates a perspective see-through view of an arrangement including springs according to certain embodiments.

FIG. 10 illustrates a perspective see-through view of an arrangement including springs according to certain embodiments. FIG. 10 illustrates the first spring 760, second spring 770, pivot 730, and so on, as in the previous figures. FIG. 10 also illustrates a base 1010, which in this case can be a brake handle lever. As shown in FIG. 10, the first base stopper 710 may include two different locations of the base: an inset or recessed portion for first spring 760 and an elevated portion for second spring 770. Likewise, the second base stopper 720 may include two locations: a tab for first spring 760 and an edge for second spring 770. As shown in FIG. 10, one end of one arm of second spring 770 may be bent down in the same direction as a tab of the second base stopper 720. Likewise, another arm of second spring 770 may be bent to curve around and cradle the elevated portion of first base stopper 710.

Figure 11:
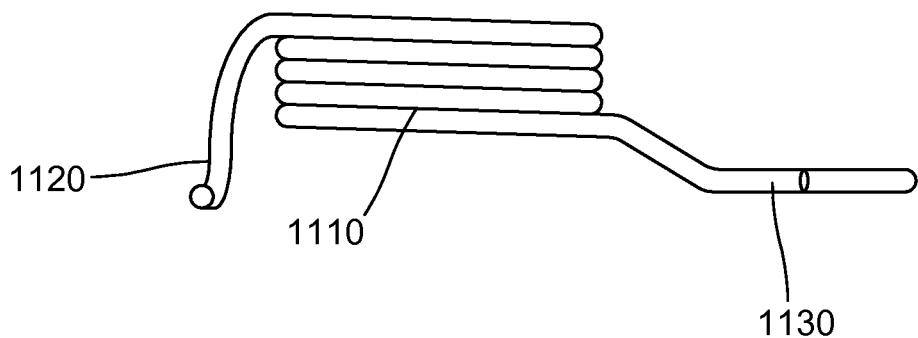
FIG. 11 illustrates a first side view of a second spring according to certain embodiments.

FIG. 11 illustrates a first side view of a second spring according to certain embodiments. The second spring can include a coil body 1110, in this case made up of five stacked coils. The second spring can also include a first arm 1120, which is bent downward and then provided with a further bend in a plane parallel to that of the coil body 1110. The second spring can further include a second arm 1130, which is bent slightly downward and curled into a c-shape in approximately the same plane as the further bent portion of the first arm 1120.

Figure 12:
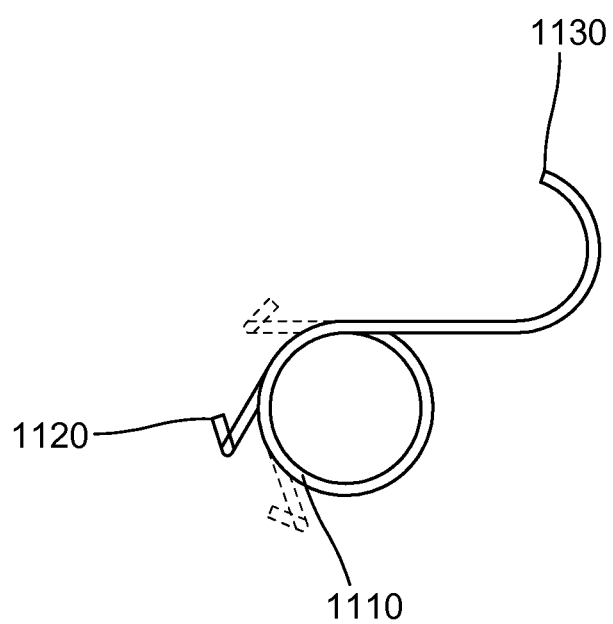
FIG. 12 illustrates a top view of a second spring according to certain embodiments.

FIG. 12 illustrates a top view of a second spring according to certain embodiments. FIG. 12 shows the same coil body 1110, first arm 1120, and second arm 1130, as in FIG. 11. Additionally, FIG. 12 illustrates positions of the first arm 1120 in a free state, namely when not installed, in a set condition, such as in the first position, as shown in FIG. 7, and in a work condition, such as in the third position, as shown in FIG. 9.

Figure 13:
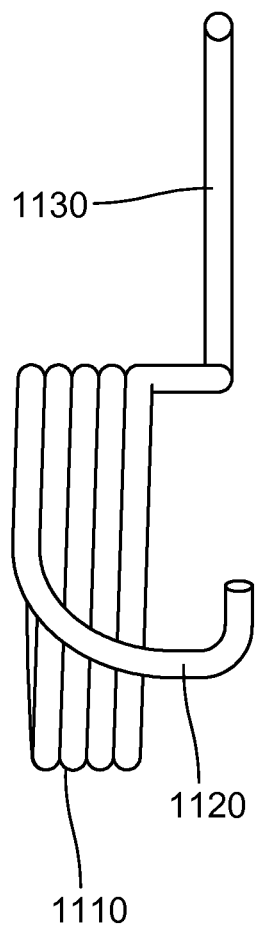
FIG. 13 illustrates a second side view of the second spring, according to certain embodiments.

FIG. 13 illustrates a second side view of the second spring, according to certain embodiments. This side view may be roughly orthogonal to the first side view. Thus, FIG. 13 shows the same coil body 1110, first arm 1120, and second arm 1130, as in FIGS. 11 and 12.

Figure 14:
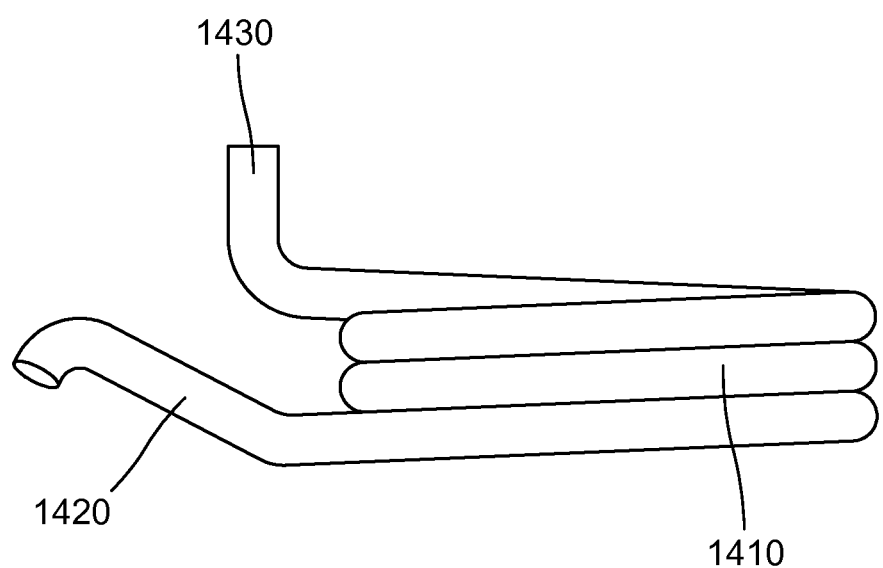
FIG. 14 illustrates a first side view of a first spring, according to certain embodiments.

FIG. 14 illustrates a first side view of a first spring, according to certain embodiments. The first spring can include a coil body 1410, in this case made up of three stacked coils. The first spring can also include a first arm 1420, which is bent slightly upward and then provided with a further bend in a slightly downward direction. The second spring can further include a second arm 1430, which is bent upward.

Figure 15:
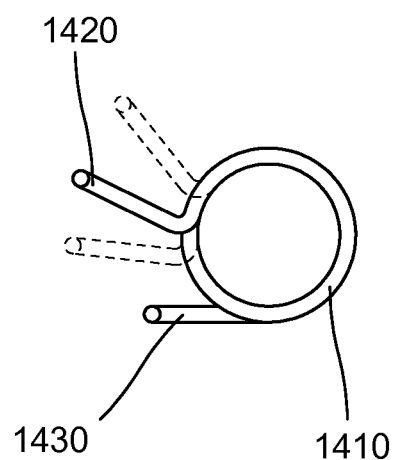
FIG. 15 illustrates a top view of a first spring according to certain embodiments.

FIG. 15 illustrates a top view of a first spring according to certain embodiments. FIG. 15 shows the same coil body 1410, first arm 1420, and second arm 1430, as in FIG. 14. Additionally, FIG. 15 illustrates positions of the first arm 1420 in a free state, namely when not installed, in a set condition, such as in the first position, as shown in FIG. 7, and in a work condition, such as in the second position, as shown in FIG. 8.

Figure 16:
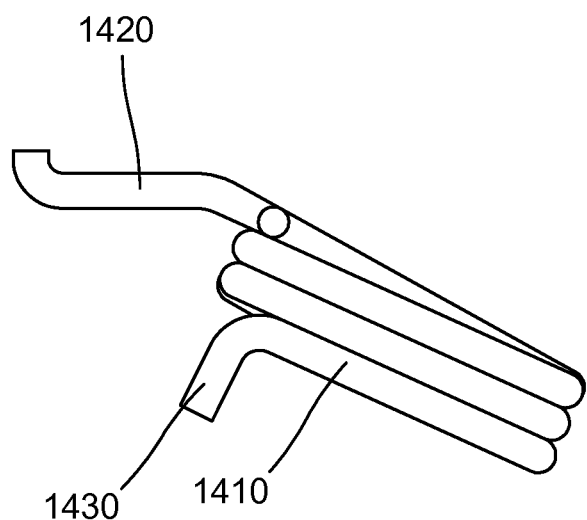
FIG. 16 illustrates a second side view of the second spring, according to certain embodiments.

FIG. 16 illustrates a second side view of the second spring, according to certain embodiments. This side view may be roughly orthogonal to the first side view. Thus, FIG. 16 shows the same coil body 1410, first arm 1420, and second arm 1430, as in FIGS. 14 and 15.

Figure 17:
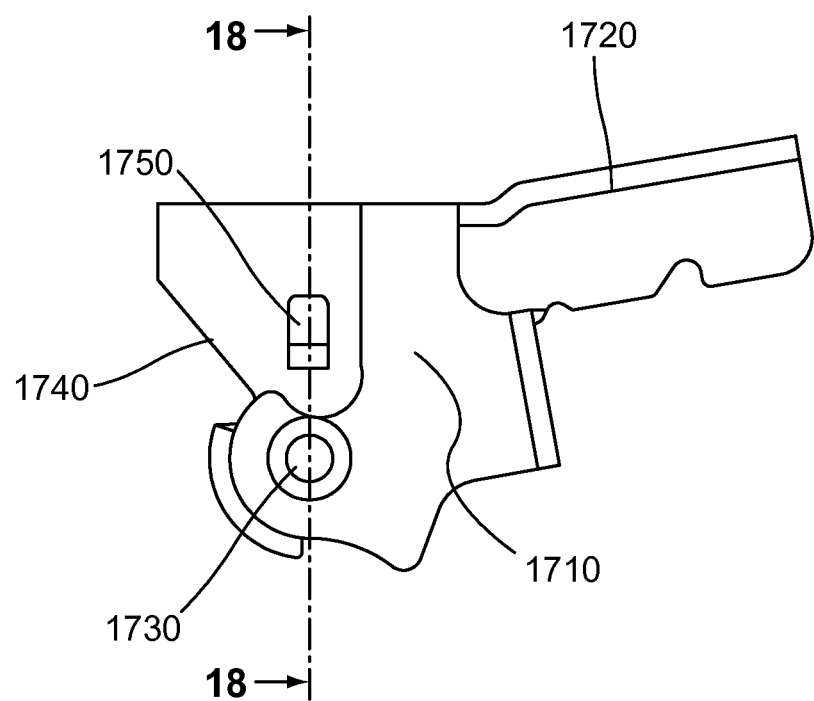
FIG. 17 illustrates a bottom view of a lever according to certain embodiments.

FIG. 17 illustrates a bottom view of a lever according to certain embodiments. The lever may include a main body portion 1710 and an extended arm portion 1720. The main body portion 1710 and the extended arm portion 1720 may be rigidly interconnected, for example made from a single piece of metal. The main body portion 1710 and the extended arm portion 1720 may be configured to pivot about pivot point 1730. The lever can include a lever stopper that may be made up of edge 1740 and tab 1750.

Figure 18:
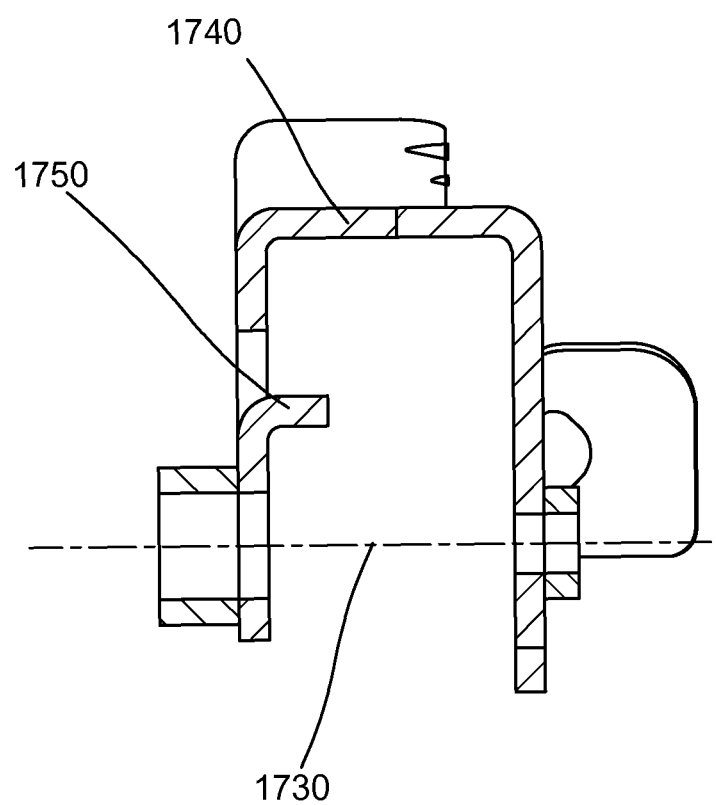
FIG. 18 illustrates a cross-sectional view of a lever according to certain embodiments.

FIG. 18 illustrates a cross-sectional view of a lever according to certain embodiments. FIG. 18 illustrates a lever viewed in cross-section along line 18 in FIG. 17. As shown in FIG. 18, the tab 1750 and edge 1740 can each extend inwardly parallel to the direction of an axis associated with the pivot point 1730.

Figure 19:
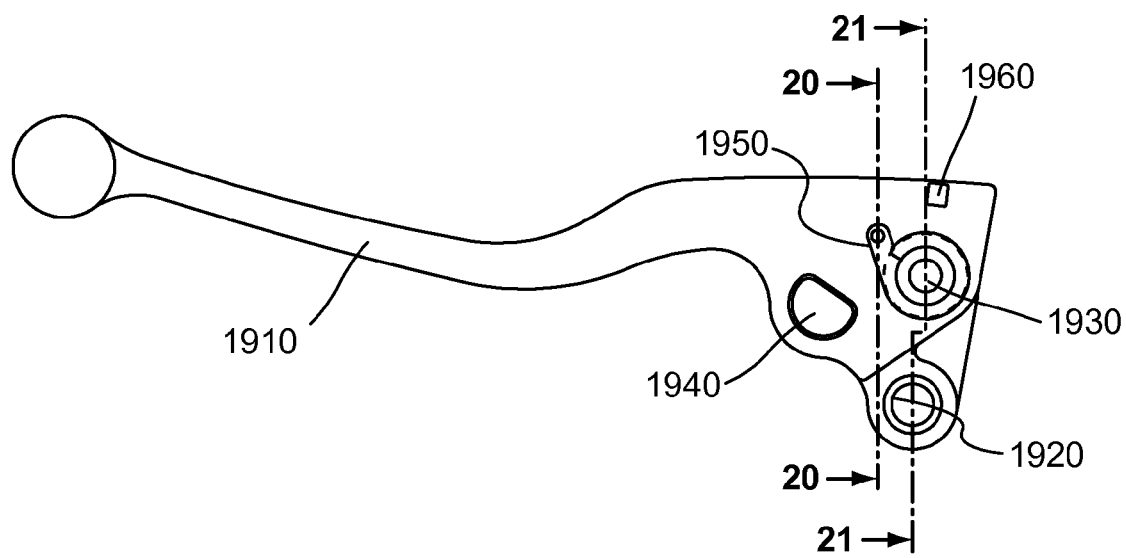
FIG. 19 illustrates a top view of a base according to certain embodiments.

FIG. 19 illustrates a top view of a base according to certain embodiments. The base may be a lever, such as a brake lever, having a handle 1910. The handle may be configured to rotate about pivot point 1920. The base can also include a lever pivot point 1930. A lever, such as that illustrated in FIGS. 17 and 18, can rotate about lever pivot point 1930.

The base can also include a first base stopper that includes an elevated portion 1940 and a recessed portion 1950. The elevated portion 1940 can be configured to interact with a second spring, such as the second spring illustrated in FIGS. 11 through 13, and the recessed portion 1950 can be configured to interact with a first spring, such as the first spring illustrated in FIGS. 14 through 16. A second base stopper 1960 can also be provided. The second base stopper 1960 can be configured to interact with the first spring.

Figure 20:
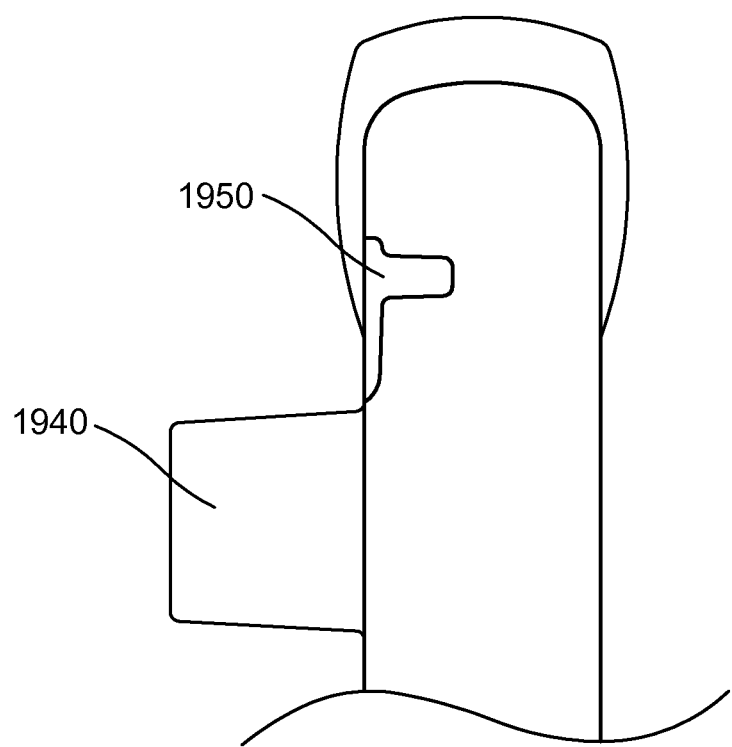
FIG. 20 illustrates a first view providing a cross-sectional view of a base according to certain embodiments.

FIG. 20 illustrates a first view providing a cross-sectional view of a base according to certain embodiments. The cross-section of FIG. 20 is taken along line 20 in FIG. 19. The cross-section illustrates both the elevated portion 1940 and the recessed portion 1950.

Figure 21:
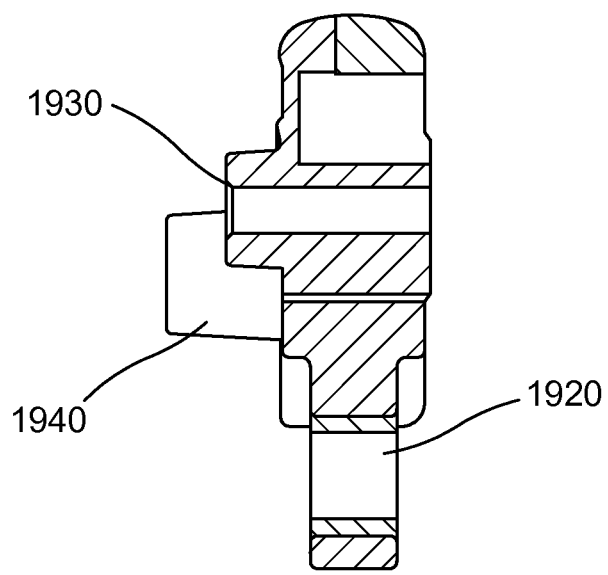
FIG. 21 illustrates a second view providing a cross-sectional view of a base according to certain embodiments.

FIG. 21 illustrates a second view providing a cross-sectional view of a base according to certain embodiments. The cross-section of FIG. 21 is taken along line 21 in FIG. 19. The cross-section illustrates pivot point 1920, lever pivot point 1930, elevated portion 1940, and the recessed portion 1950.

Figure 22A:
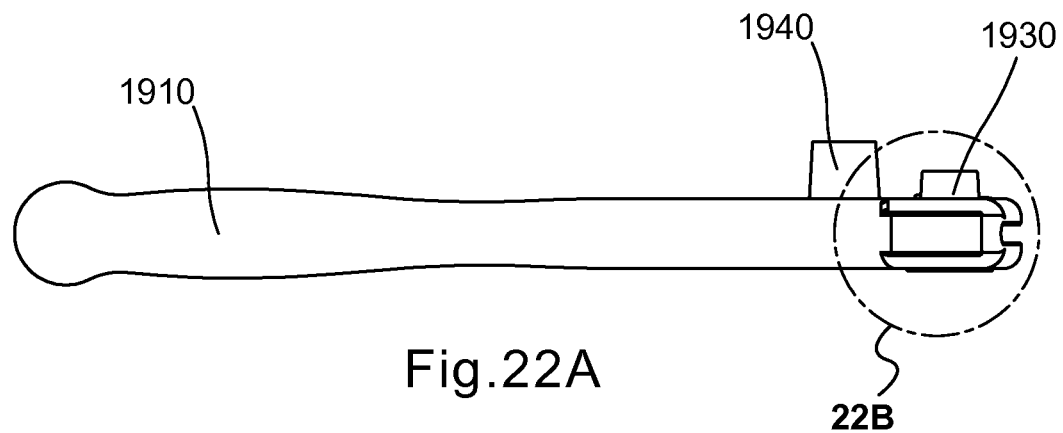
FIGS. 22A and 22B illustrate a third view providing a side view of a base according to certain embodiments.
Figure 22B:
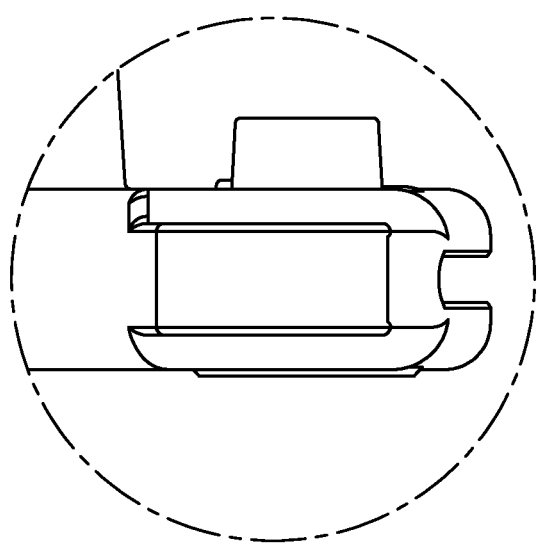

FIGS. 22A and 22B illustrate a third view providing a side view of a base according to certain embodiments. FIG. 22A shows a handle 1910, as well as the elevated portion 1940 and lever pivot point 1930. FIG. 22B shows detail at section 22B of FIG. 22A.

Figure 23:
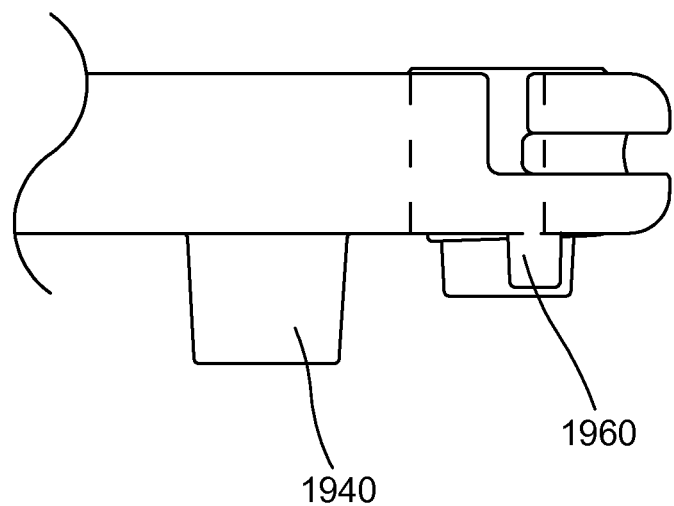
FIG. 23 illustrates a fourth view providing a cross-sectional view of a base according to certain embodiments.

FIG. 23 illustrates a fourth view providing a cross-sectional view of a base according to certain embodiments. FIG. 23 particularly shows second base stopper 1960 and elevated portion 1940.

Various modifications to the above embodiments are possible. For example, while torsion springs are employed by certain embodiments, other biasing mechanisms are also possible. For example, it may be possible to replace the coil springs with cantilever spring, a volute spring, or a constant-force spring.

For another example, the parts as illustrated are made from metal. However, the parts may be made not only from various metals and metal alloys, but also from polymers or carbon fibers. Other materials are also permitted.

Figure 24:
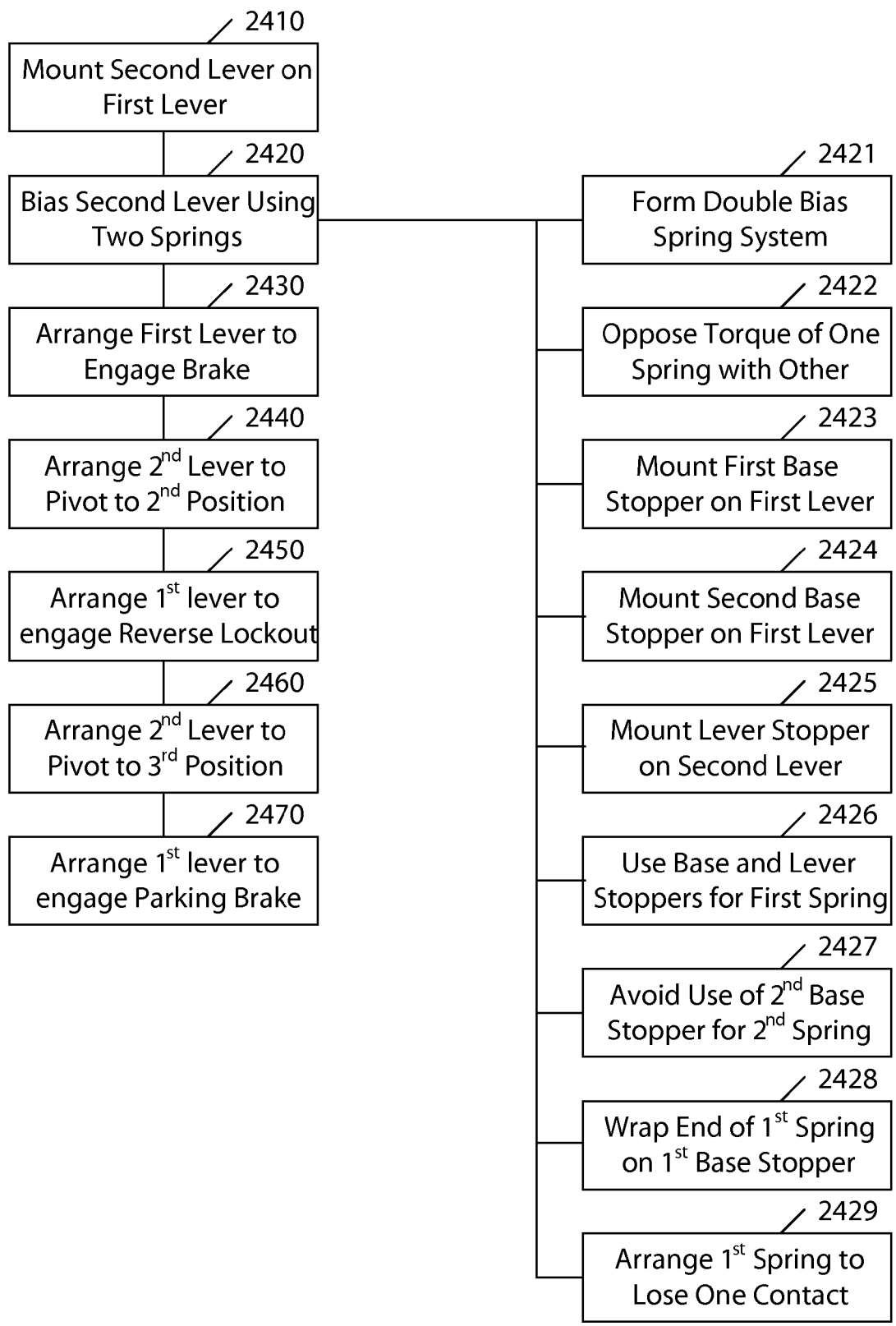
FIG. 24 illustrates a method according to certain embodiments.

FIG. 24 illustrates a method according to certain embodiments. As shown in FIG. 24, a method can include, at 2410, mounting a second lever on a first lever configured to pivot about a first axis, wherein the second lever is mounted to pivot about a second axis offset from the first axis.

The method can also include, at 2420, biasing the second lever to a first position by a first spring and a second spring. The biasing can include, at 2421, arranging the first spring and the second spring together as a double bias spring system. The biasing can also include, at 2422, opposing a torque of the first spring to an opposite torque of the second spring.

The biasing can further include, at 2423, mounting a first base stopper on the first lever. The method can additionally include, 2424, mounting a second base stopper on the first lever. The method can also include, at 2425, mounting a lever stopper on the second lever. The method can further include, at 2426, arranging the first spring to be stopped by the first base stopper, the second base stopper, and the lever stopper. The method can additionally include, at 2427, arranging the second spring to be stopped by the first base stopper and the lever stopper, but not the second base stopper.

The biasing can include, at 2428, wrapping a first end of the first spring partially around the first base stopper. The method can also include, at 2429, arranging the first spring to lose contact with the second base stopper by movement of the second lever into the second position.

The method can further include, at 2430, arranging the first lever to engage a braking system of a vehicle when the first lever is pivoted about the first axis and the second lever is in the first position.

The method can additionally include, at 2440, arranging the second lever to be pivoted about the second axis to a second position different from the first position. The method can also include, at 2450, arranging the first lever to disengage a reverse lockout system of the vehicle when the second lever is in the second position.

The method can further include, at 2460, arranging the second lever to be pivoted about the second axis to a third position different from the first position or the second position. The method can additionally include, at 2470, arranging the first lever to hold in a brake activated position to function as a parking brake of the vehicle when the second lever is in the third position.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

In order to determine the metes and bounds of the invention, therefore, reference should be made to the appended claims.

We claim:

1. An apparatus, comprising:
   a first lever configured to pivot about a first axis; and
   a second lever mounted with the first lever and configured further to pivot about a second axis offset from the first axis,
   wherein the second lever is configured to be biased to a first position by a first spring and a second spring,
   wherein the first lever is configured to engage a braking system of a vehicle when the first lever is pivoted about the first axis and the second lever is in the first position,
   wherein the second lever is configured to be pivoted about the second axis to a second position different from the first position,
   wherein the first lever is configured to disengage a reverse lockout system of the vehicle when the second lever is in the second position,
   wherein the second lever is configured to be pivoted about the second axis to a third position different from the first position or the second position, and
   wherein the first lever is configured to hold in a brake activated position to function as a parking brake of the vehicle when the second lever is in the third position.

2. The apparatus of claim 1, wherein the first spring and the second spring are configured together as a double bias spring system.

3. The apparatus of claim 1, wherein the first spring is configured to exert an opposite torque to the second spring.

4. The apparatus of claim 1, wherein the first spring and the second spring are configured to rotate about a same pivot.

5. The apparatus of claim 1, wherein the first spring is configured to exert a greater torque than the second spring.

6. The apparatus of claim 1, wherein each of the first spring and the second spring is a torsion spring.

7. The apparatus of claim 1, further comprising:
   a first base stopper;
   a second base stopper; and
   a lever stopper,
   wherein the first spring is configured to be stopped by the first base stopper, the second base stopper, and the lever stopper, and
   wherein the second spring is configured to be stopped by the first base stopper and the lever stopper, but not the second base stopper.

8. The apparatus of claim 7, wherein the first base stopper extends from the first lever.

9. The apparatus of claim 7, wherein the second base stopper extends from the first lever.

10. The apparatus of claim 7, wherein the lever stopper extends from the second lever.

11. The apparatus of claim 7, wherein a first end of the first spring is configured to wrap partially around the first base stopper.

12. The apparatus of claim 7, wherein the first spring is configured to lose contact with the second base stopper by movement of the second lever into the second position.

13. The apparatus of claim 1, wherein the first spring is configured to be compressed by movement of the second lever into the second position.

14. The apparatus of claim 1, wherein the second spring is configured to be compressed by movement of the second lever into the third position.

15. A method, comprising:
   mounting a second lever on a first lever configured to pivot about a first axis, wherein the second lever is mounted to pivot about a second axis offset from the first axis;
   biasing the second lever to a first position by a first spring and a second spring;
   arranging the first lever to engage a braking system of a vehicle when the first lever is pivoted about the first axis and the second lever is in the first position;
   arranging the second lever to be pivoted about the second axis to a second position different from the first position;
   arranging the first lever to disengage a reverse lockout system of the vehicle when the second lever is in the second position;
   arranging the second lever to be pivoted about the second axis to a third position different from the first position or the second position; and
   arranging the first lever to hold in a brake activated position to function as a parking brake of the vehicle when the second lever is in the third position.

16. The method of claim 15, further comprising:
   arranging the first spring and the second spring together as a double bias spring system.

17. The method of claim 15, further comprising:
   opposing a torque of the first spring to an opposite torque of the second spring.

18. The method of claim 15, further comprising:
   mounting a first base stopper on the first lever;
   mounting a second base stopper on the first lever;
   mounting a lever stopper on the second lever;
   arranging the first spring to be stopped by the first base stopper, the second base stopper, and the lever stopper; and
   arranging the second spring to be stopped by the first base stopper and the lever stopper, but not the second base stopper.

19. The method of claim 18, further comprising:
   wrapping a first end of the first spring partially around the first base stopper.

20. The method of claim 18, further comprising:
   arranging the first spring to lose contact with the second base stopper by movement of the second lever into the second position.

21. An apparatus, comprising:
   a first lever configured to pivot about a first axis; and
   a second lever mounted with the first lever and configured further to pivot about a second axis offset from and parallel to the first axis,
   wherein the second lever is configured to be biased to a first position by a first spring and a second spring,
   wherein the second lever is configured to be pivoted about the second axis to a second position different from the first position, and
   wherein the second lever is configured to be pivoted about the second axis to a third position different from the first position or the second position.

* * * * *